Nov. 1, 1960    G. P. M. BERNIER    2,958,239
VARIABLE-SPEED EPICYCLIC GEAR TRAIN TRANSMISSION-DEVICE
Filed Feb. 28, 1958
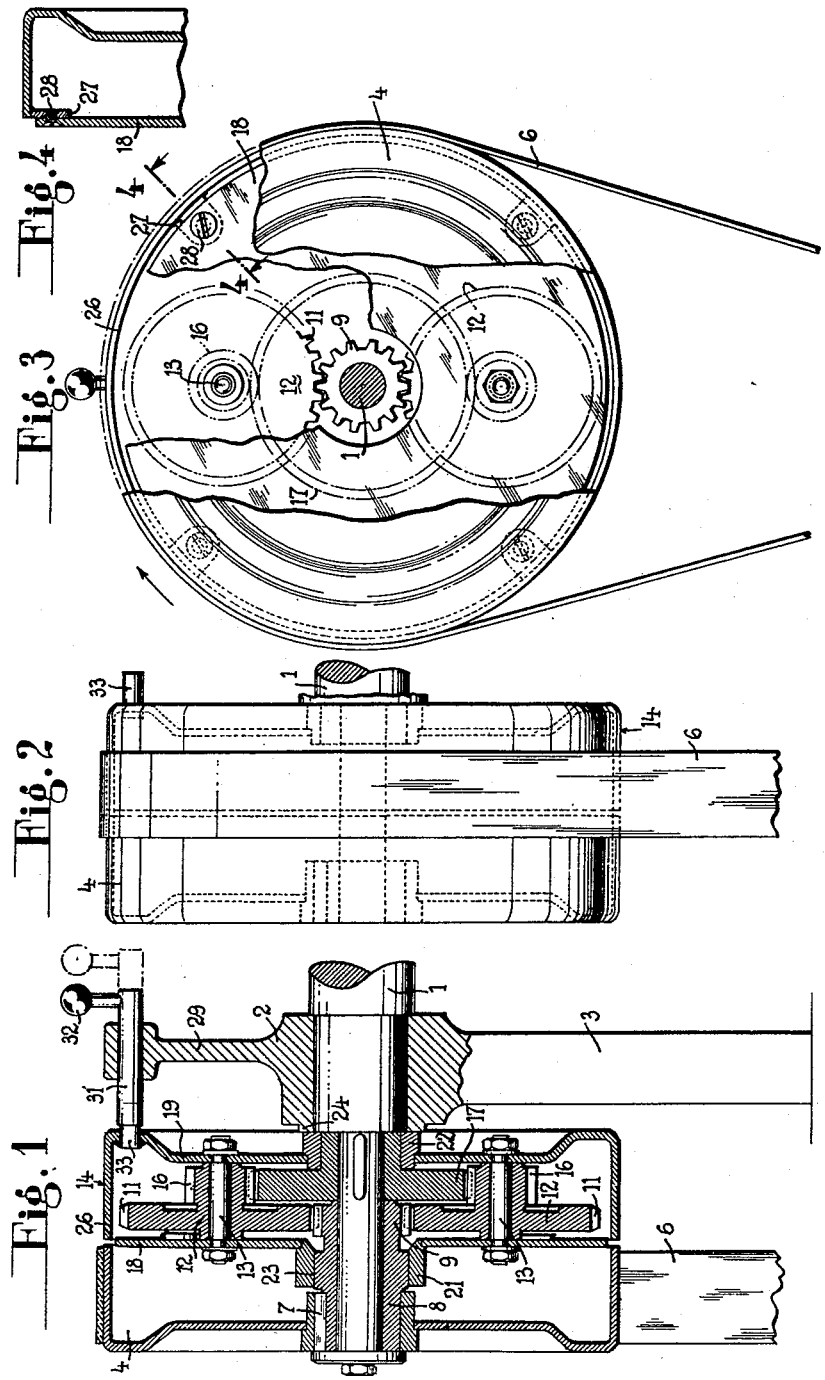

2,958,239

VARIABLE-SPEED EPICYCLIC GEAR TRAIN TRANSMISSION-DEVICE

Gaston Pierre Marie Bernier, Chalonnes-sur-Loire, France, assignor to Constructions Meca-Metalliques Chalonnaises, Chalonnes-sur-Loire, France, a French body corporate Filed Feb. 28, 1958, Ser. No. 718,360

Claims priority, application France Mar. 4, 1957

1 Claim. (Cl. 74—789)

The present invention relates to variable-speed epicyclic gear train transmission devices.

An object of the invention is to provide a variable-speed transmission device comprising a pulley driven by a belt and rigid with the input member of the gear train, and a planet gear carrier constituting a cylindrical drum or cage which has the same diameter as the pulley and is in adjacent relationship to the latter, whereby the drum is rendered rigid with the pulley by the belt in a position of the latter in which it overlaps the pulley and drum.

A locking device is also provided for holding the drum stationary when the latter is not rigid with the pulley.

Owing to this arrangement, there are made available in a very simple manner a first transmission ratio when the drum is held stationary and the belt passes solely around the pulley, and a second transmission ratio when the belt drives the pulley and the drum at the same speed, intermediate transmission ratios being obtainable by causing slip between the belt and the drum. Further, a neutral transmission or free-wheel position is obtained when the belt passes solely around the pulley and the drum is free to rotate in the opposite direction to the pulley.

Further features and advantages of the invention will be apparent from the ensuing description with reference to the accompanying drawing, to which the invention is in no way restricted.

In the accompanying drawing:

Fig. 1 is an axial sectional view of the device embodying the invention, the drum being locked in position and the belt passing solely around the pulley;

Fig. 2 is an elevational view of the device, the belt being in a position where it overlaps the pulley and drum;

Fig. 3 is a side elevational view with parts broken away, and

Fig. 4 is a partial sectional view taken along line 4—4 of Fig. 3.

In the embodiment shown in the figures, the variable speed transmission device is adapted to drive a driven shaft 1 journalled in a bearing 2 supported by a stand 3, the driving pulley 4 of the device being driven by a belt 6. Fig. 1 represents a geared-down drive of the shaft 1 and Fig. 2 a direct drive.

The pulley 4 is keyed at 7 on an axial extension 8 of an input sun gear 9 which is freely rotative on the shaft 1 and meshes with toothing 11 of two large planet gears 12 which have double toothing and are rotatably mounted on spindles 13 rigid with a planet gear carrier 14, the other toothing 16, of smaller diameter, of the planet gears meshing with an output sun gear 17 keyed on the shaft 1.

The planet gear carrier 14 comprises two side members 18 and 19 which are rigid with hubs 21 and 22 respectively, the hubs being freely rotative on corresponding bearing faces 23 and 24 provided on the gears 9 and 17 respectively. The side member 19 disposed on the side of the gear train remote from the pulley is extended in the form of a drum 26 which has the same diameter as the pulley and is in adjacent relationship thereto (Fig. 1). The end of the drum immediately adjacent the pulley is provided with lugs 27 which are secured by screws 28 (Figs. 3 and 4) to the side member 18 so that the planet gear carrier 14 constitutes a rigid cage.

A locking device, shown diagrammatically in Fig. 1, is provided to hold the planet gear carrier 14 stationary relative to the stand 3. This locking device comprises an arm 29 rigid with the stand 3 and supporting a sliding rod 31 which is provided with a control knob 32 and is capable of being placed in the path of a pin 33 fixed to the side member 19 in the vicinity of the periphery of the latter.

The device of the invention operates in the following manner:

When the belt 6 passes solely around the pulley 4, as shown in Fig. 1, and the locking rod 31 does not lie in the path of the pin 33 (corresponding to its position shown in dot-dash line in Fig. 1), the resistance of the shaft 1 prevents the output sun gear 17 from rotating and when the pulley rotates in the direction of the arrow (Fig. 3), the planet gear carrier is driven in the opposite direction, the device being therefore in its neutral position.

If the planet gear carrier 14 is held stationary by causing the rod 31 to engage the pin 33 as shown in Fig. 1, and the pulley 4 is driven in rotation, the shaft 1 is driven in rotation at the low speed corresponding to the speed reduction created by the pairs of meshing gears 9, 11 and 16, 17. When it is required to obtain a direct drive between the belt 6 and the shaft 1, it is merely necessary to disengage the rod 31 from the pin 33 and to shift the belt 6 from the position shown in Fig. 1 to that shown in Fig. 2 where it overlaps both the pulley 4 and the drum 26 rigid with the planet gear carrier 14. In this position, there is no relative rotation between the sun gears and planet gears and the rotational speed of the shaft 1 is identical to that of the driving pulley 4.

In the intermediate positions of the belt 6 between the positions shown in Figs. 1 and 2, slip could occur between the belt and the drum 26, and in this case the device performs the function of a speed variator, the rotational speed of the shaft 1 varying between low speed corresponding to Fig. 1 and high speed corresponding to Fig. 2.

Although a specific embodiment of the invention has been described, many modifications and changes may be made therein without departing from the scope of the invention as defined in the appended claim.

Having described my invention what I claim as new and desire to secure by Letters Patent is:

Two-speed transmission device comprising a frame, a shaft journalled in said frame, a pulley freely rotatable relative to said shaft, a driving belt passing around said pulley, a first sun gear coaxial and rigid with said pulley, a second sun gear fixed to said shaft and having a diameter different from that of said first sun gear, a planet gear carrier in the form of a drum which is coextensive with and in adjacent relationship to said pulley and rotative relative to said shaft, planet gears rotatably mounted on said planet gear carrier within said drum and having each two toothed portions meshing with said first and second sun gears respectively, means for releasably locking said planet gear carrier to cause said shaft to rotate at a speed different from that of said pulley, said belt being movable axially of said pulley and drum so as to overlap and simultaneously drive said pulley and said drum, whereby said sun gears and planet gears may rotate in substantially locked-up condition to drive said shaft at the same speed as said pulley.

References Cited in the file of this patent

UNITED STATES PATENTS

| | | |
|---|---|---|
| 339,912 | Maxson | Apr. 13, 1886 |
| 523,221 | Mann et al. | July 17, 1894 |
| 1,574,383 | Fraser | Feb. 23, 1926 |